(12) United States Patent
Sommerfeld et al.

(10) Patent No.: US 6,325,465 B1
(45) Date of Patent: Dec. 4, 2001

(54) QUICK RELEASE MECHANISM FOR A RAILWAY CAR HAND BRAKE

(75) Inventors: Howard Sommerfeld, Oak Forest; Angelo M. Labriola, Blue Island, both of IL (US); Everett G. Ring, Gary, IN (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/664,210

(22) Filed: Sep. 18, 2000

(51) Int. Cl.[7] ..................................................... B60T 17/02
(52) U.S. Cl. .............................. 303/13; 188/33; 188/107; 188/153 R; 74/523; 74/528
(58) Field of Search .................................. 303/13, 66, 7, 303/14, 128, 22.6, 22.7, 89; 188/107, 170, 265, 33, 153 R, 106 R; 74/89, 89.1, 528, 43, 148, 504, 523, 524, 525, 526, 536, 505

(56) References Cited

U.S. PATENT DOCUMENTS

| | | | |
|---|---|---|---|
| 3,668,944 | 6/1972 | Natschke | 74/505 |
| 3,923,287 | * 12/1975 | Weseloh et al. | 254/150 R |
| 3,988,944 | * 11/1976 | Klasing | 74/505 |
| 6,179,093 | * 1/2001 | Daugherty, Jr. | 188/33 |

* cited by examiner

*Primary Examiner*—Pam Rodriguez
(74) *Attorney, Agent, or Firm*—James Ray & Associates

(57) ABSTRACT

A quick release mechanism for a railcar hand brake comprises a release shaft having a first end and a second end. The first end includes a cavity of a predetermined size and shape. A release lever has a hub journaled on the first end of the release shaft. A stop of a predetermined size and shape is disposed on the circumference of the hub of the release lever and engageable with the cavity of the release shaft to rotate such release shaft to cause free release of the brakes. A projection of a predetermined size and shape is disposed on the second end of the release shaft. An attachment of a predetermined size and shape is mounted to an inside wall of a housing of such hand brake. A tension member has a first end and a second end. The first end is secured to the projection, and the second end is secured to the attachment whereby the tension member will return the release shaft to the brake application position.

22 Claims, 4 Drawing Sheets

QUICK RELEASE MECHANISM FOR A RAILWAY CAR HAND BRAKE

CROSS-REFERENCE TO RELATED APPLICATION

The invention taught in the present application is closely related to the invention taught in co-pending patent application titled "Apparatus For A Quick Release Mechanism In A Railcar Hand Brake", filed concurrently herewith and having Ser. No. 09/664,212. This application is assigned to the assignee of the present application. The teachings of this co-pending patent application are incorporated herein by reference thereto.

FIELD OF THE INVENTION

The present invention relates, in general, to a railcar hand brake, and more particularly, to a quick release mechanism for a vertical wheel hand brake. The present invention prevents the quick release handle from remaining extended beyond the hand brake housing when a force is applied to the quick release handle to release the brakes by allowing the handle to freely return to its original position when the force is removed.

BACKGROUND OF THE INVENTION

Prior to the present invention, when a free quick release of the brake is desired on a railcar with a vertical wheel hand brake, a quick release mechanism is activated. An upward force is exerted on the release lever to move the attached brake release shaft, whereby disengaging and releasing the brake. The release lever is typically welded to the release shaft. This upward force moves the handle away from, and outside the envelope of the hand brake housing. After the handle is released, the weight will bring it back to the brake application position. However, in a typical operating environment, external factors such as debris or internal component interference result in preventing the quick release mechanism from returning to its application position. The brake release handle thus remains extended out from the hand brake housing. This can be a safety issue on railcars that are supplied with ladders attached close to the hand brake.

An example of this type hand brake is taught in U.S. Pat. No. 3,668,944, and the Universal 7400 Model Hand Brake. The teachings of these references are incorporated herein by reference thereto.

SUMMARY OF THE INVENTION

In a first aspect, the present invention provides a quick release mechanism for a railcar hand brake, comprising a release shaft having a first end and a second end. The first end includes a cavity of a predetermined size and shape. The quick release lever has a hub journaled on the first end of the quick release shaft. A stop of a predetermined size and shape is disposed on the circumference of the hub of the quick release lever and engageable with the cavity on the release shaft to rotate the release shaft and cause free release of the brakes. A projection of a predetermined size and shape is disposed on the second end of the release shaft. An attachment of a predetermined size and shape is mounted on the inside wall of the hand brake housing. A tension member having a first end secured to the projection, and a second end secured to the attachment is used to return the release shaft to the brake application position when brake application is desired. In a further aspect, the present invention provides for a quick release mechanism in combination with a railcar hand brake. The invention has a release shaft rotatably mounted in a railcar hand brake, with a first end including a cavity of a predetermined size and shape, and a second end. A quick release lever having a hub is journaled on the first end of the quick release shaft. A stop of a predetermined size and shape is disposed on the circumference of the hub of the quick release lever and engageable with the cavity to rotate the release shaft and cause free release of the brakes. A projection of a predetermined size and shape is disposed on the second end of the release shaft. An attachment of a predetermined size and shape is mounted to the inside wall of the hand brake housing, and a tension member having a first end and a second end is secured to the projection and the attachment, respectively, to return the release shaft to the brake application position when brake application is desired.

OBJECTS OF THE INVENTION

It is therefore a primary object of the present invention to provide a device for allowing the release handle of a quick release mechanism to return to the brake application position independent of the release shaft after the force applied to the handle to activate the quick release mechanism is removed.

Another object of the present invention is to minimize the potential for the quick release handle to remain extended into the path of the railcar ladder.

Still another object of the invention is to provide a mechanism for applying a force to the release shaft to place the moveable cam in position with the winding gear for future brake application when required.

In addition to the various objects of the invention that have been described above, various other objects and advantages of the invention will become more readily apparent to those persons skilled in the relevant art from the following more detailed description of the invention, particularly, when such description is taken in conjunction with the attached drawing figures and the appended claims.

Figure 1:
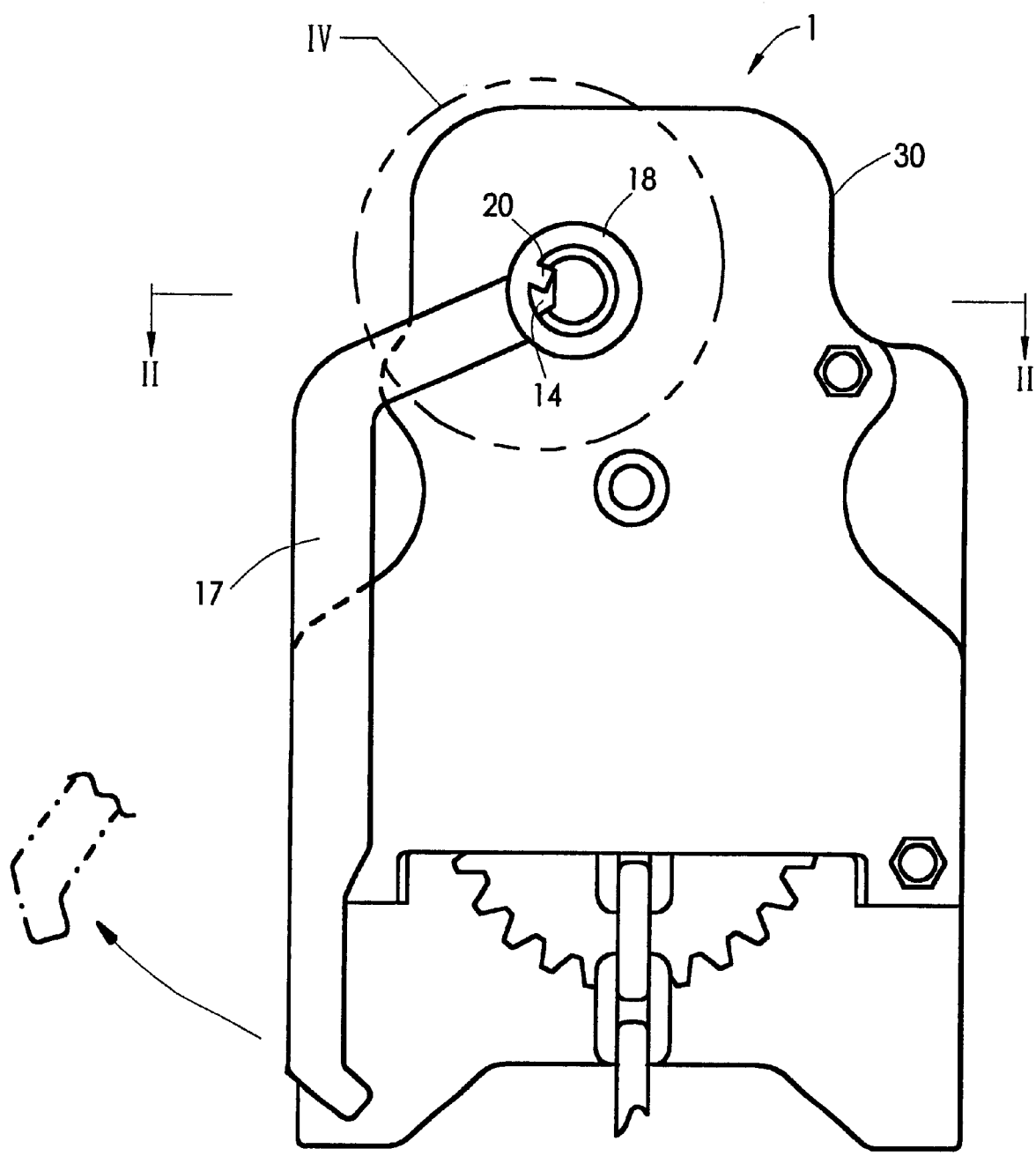
FIG. 1 is a front elevational view of a railcar vertical hand brake of the present invention.

BRIEF DESCRIPTION OF A PRESENTLY PREFERRED AND VARIOUS ALTERNATIVE EMBODIMENTS OF THE PRESENT INVENTION

Prior to proceeding to a more detailed description of the invention, it should be noted that identical components having identical functions have been designated with identical reference numerals for the sake of clarity.

Figure 2:
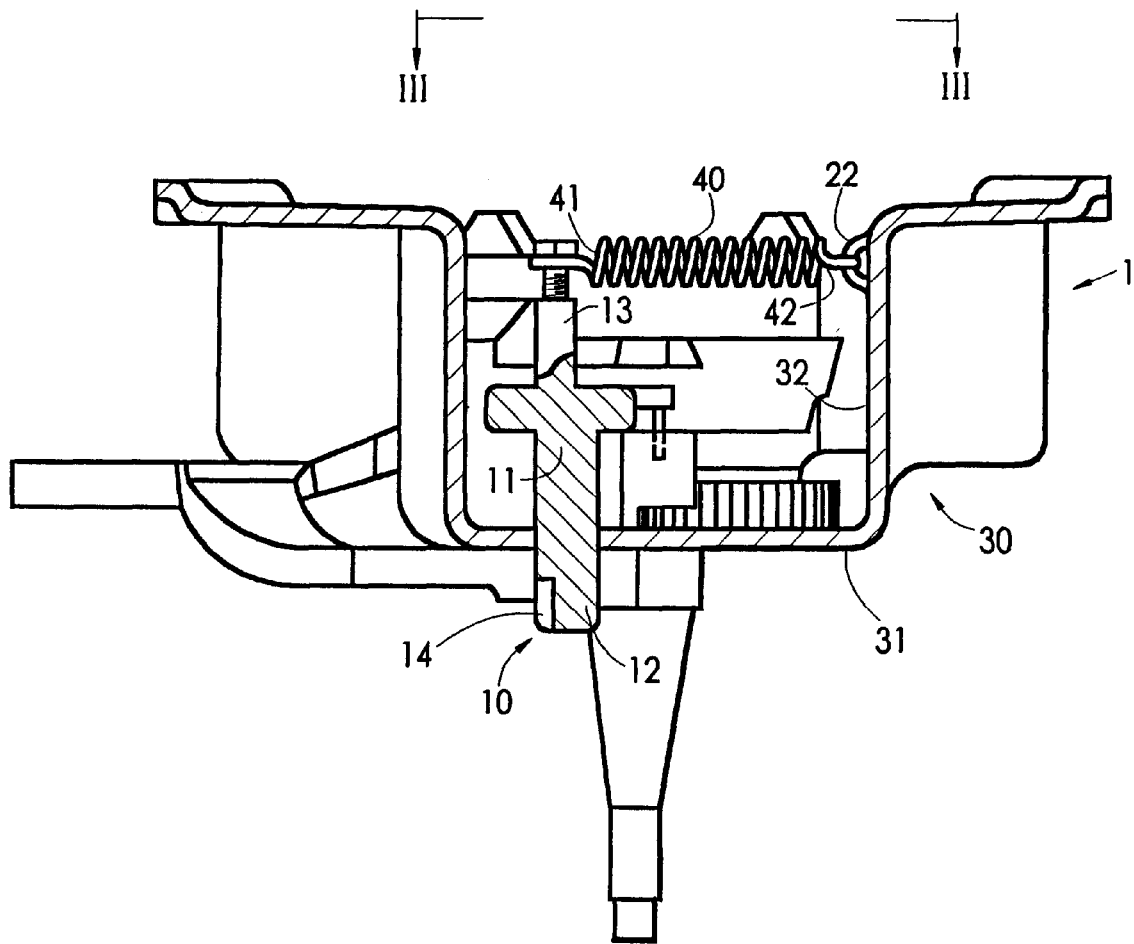
FIG. 2 is a top sectional view taken along the lines of II—II of FIG. 1.
Figure 3:
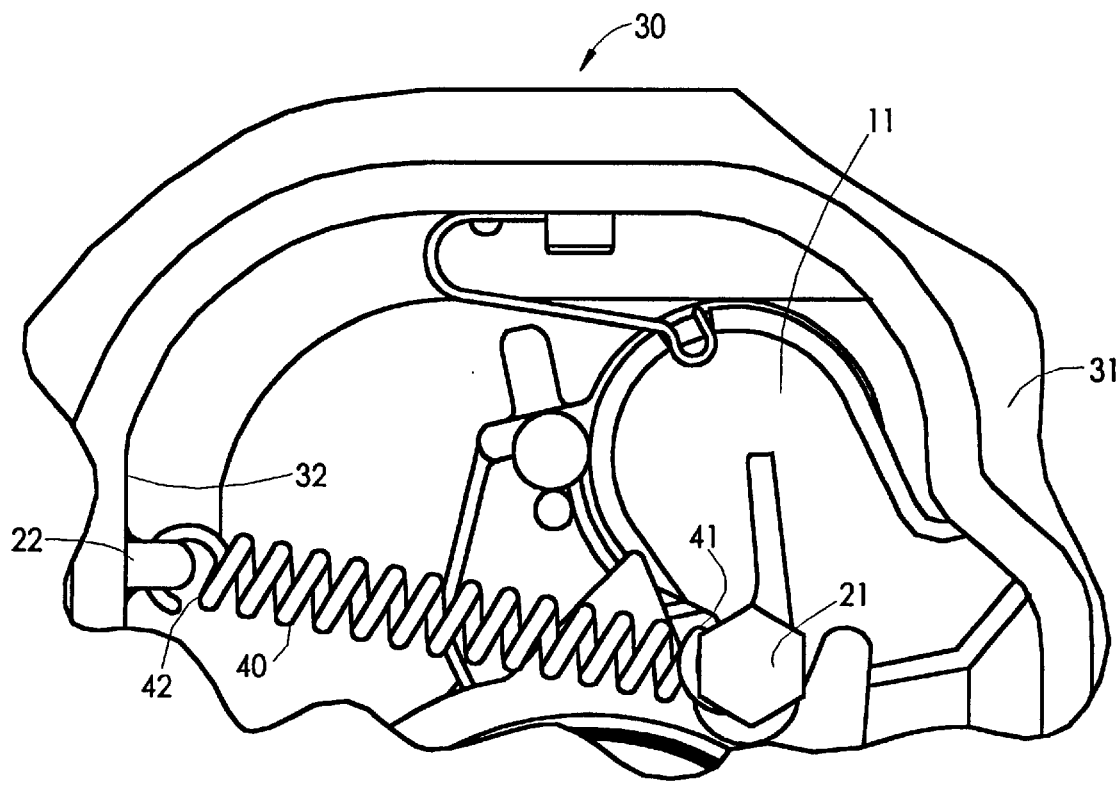
FIG. 3 is a rear elevational view taken from a section of FIG. 2.
Figure 4:
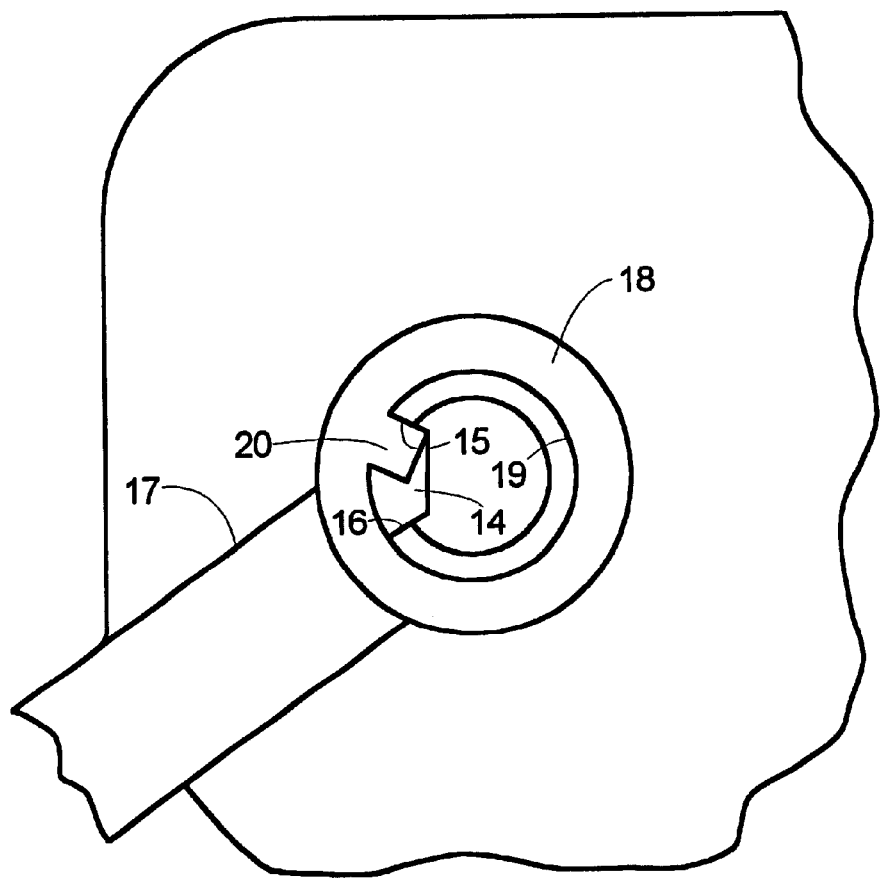
FIG. 4 is a detailed view of a section taken from the front elevational view of FIG. 3.
Figure 5:
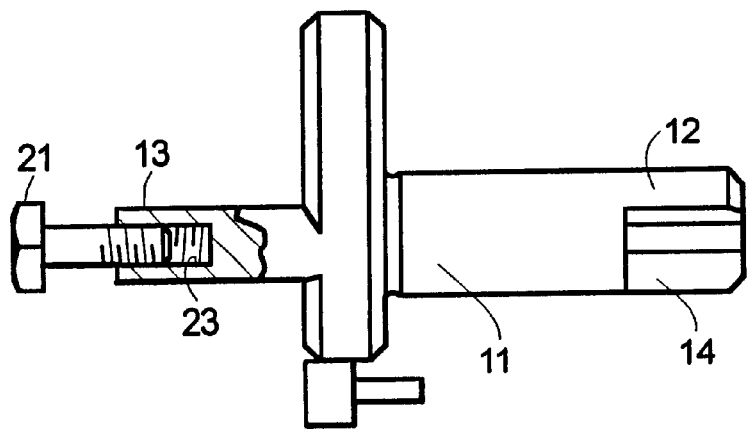
FIG. 5 is a side view of the release shaft of a railcar vertical hand brake of the present invention.

Now refer more particularly to FIGS. 1, 2, 3, 4, and 5 of the drawings. Illustrated therein is a railcar hand brake, generally designated 1, having a housing, generally designated 30, and a quick release mechanism, generally designated 10, comprising a release shaft 11, having a first end 12 and a second end 13, and a cavity 14 of a predetermined size and shape. Preferably, the shape of the first end 12 and the second end 13 of the release shaft 11 is substantially cylindrical, and the cavity 14 is a notch disposed circumferentially about the longitudinal axis of the release shaft 11, and is a predetermined length extending from the first end 12 along the longitudinal axis of the release shaft 11. The notch 14 has a first surface 15 and a second surface 16. A quick release lever 17 has a hub 18, having an inside wall 19 that is journaled on the first end 12 of the release shaft 11. A stop 20 of a predetermined size and shape is disposed on the inside wall 19 of the hub 18 of the quick release lever 17 for engagement with the cavity 14 on the release shaft 11 to cause rotation of the release shaft 11 to release the brake. When free brake release is desired, a force is applied to the quick release lever 17 to move it from a lower position of FIG. 1 to the upper position of FIG. 1. As the quick release lever 1 is moved, the stop 20 engages with the first surface 15 of the notch 14, rotating the release shaft 11 and releasing the brake. When the force on the quick release lever 17 ceases, the stop 20 is free to fall within the notch on the shaft, allowing the attached quick release lever 17 to return to its original lower position. Because the quick release lever 17 is unattached to the release shaft 11, the weight of the quick release lever 17 cannot inadvertently re-engage the brake.

To achieve brake application, a projection 21 of a predetermined size and shape is disposed on the second end 13 of the release shaft 11. Preferably, the projection 21 is a threaded bolt that is axially aligned and engageable with a threaded hole 23 of a predetermined diameter and depth axially located on the second end 13 of the release shaft 11. An attachment 22 of a predetermined size and shape is mounted to an inside wall 32 of the front casing 31 of the housing 30. Preferably, the attachment is annular. A tension member 40 has a first end 41 and a second end 42. The first end 41 of the tension member 40 is secured to the projection 21, and the second end 42 is secured to the attachment 22. Preferably, the tension member 40 is a spring of a predetermined length and load rating. The force of the tension member 40 rotates the release shaft back into the brake application position.

Now referring again to FIGS. 1, 2, 3, 4, and 5 illustrated herein is a quick release mechanism, generally designated 10, in combination with a railcar hand brake, generally designated 1. The combination comprises a release shaft 11, rotatably mounted in the railcar hand brake 1, having a first end 12, a second end 13, and a cavity 14 of a predetermined size and shape. Preferably, the shape of the first end 12 and the second end 13 of the release shaft 11 is substantially cylindrical, and the cavity 14 is a notch having a first surface 15 and a second surface 16 disposed along the longitudinal axis of the release shaft 11. A quick release lever 17 has a hub 16, which is journaled on the first end 12 of the release shaft 11. A stop 20 of a predetermined size and shape is disposed on the circumference of the hub 16 of the quick release lever 17 for engagement with the cavity 14 on the release shaft 11 to cause rotation of the release shaft 11 to release the brake. When free brake release is desired, a force is applied to the release lever 17 to move it from a lower position of FIG. 1 to the upper position of FIG. 1. As the quick release lever 17 is moved, the stop 20 engages with the first surface 15 of the cavity 14, rotating the release shaft 11 and releasing the brakes. Preferably, the stop 20 is disposed within the cavity 14. When the force on the quick release lever 17 ceases, the stop 20 is free to fall within the cavity 14 on the shaft, allowing the quick release lever 17 to return to its original lower position. Because the quick release lever 17 is unattached to the release shaft 11, the weight of the quick release lever 17 cannot re-engage the brake until brake. Therefore, a projection 21 of a predetermined size: and shape is disposed on the second end 13 of the release shaft 11. Preferably, the projection 21 is a threaded bolt that is axially aligned and engageable with a threaded hole 23 of a predetermined diameter and depth axially located on the second end 13 of the release shaft 11. An attachment 22 of a predetermined size and shape is mounted to an inside wall 32 of the front casing 31 of the housing 30. Preferably, the attachment is annular. A tension member 40 has a first end 41 and a second end 42. The first end 41 of the tension member 40 is secured to the projection 21, and the second end 42 is secured to the attachment 22. Preferably, the tension member 40 is a spring of a predetermined length and load rating. The force of the tension member 40 rotates the release shaft back into brake application position.

Although the invention has been shown in connection with a certain specific embodiment, it will be readily apparent to those skilled in the art that various changes in form and arrangement of parts and method may be made to suit requirements without departing from the spirit and scope of the invention.

We claim:

1. A quick release mechanism for a railcar hand brake, said quick release mechanism comprising:
   a. a release shaft of a predetermined size and shape having a first end and a second end, said first end including a cavity of a predetermined size and shape;
   b. a release lever having a hub journaled on said first end of said release shaft;
   c. a stop of a predetermined size and shape disposed on the circumference of said hub of said release lever and engageable with said cavity of said release shaft to rotate said release shaft and cause free release of the brake;
   d. a projection of a predetermined size and shape disposed on said second end of said release shaft;
   e. an attachment of a predetermined size and shape adapted to be mounted to an inside wall of a housing of such hand brake; and
   f. a tension member having a first end and a second end, said first end of said tension member secured to said projection, and said second end of said tension member secured to said attachment whereby said tension member will return said release shaft to the brake application position.

2. The device according to claim 1 wherein the shape of said first end and said second end of said release shaft is substantially cylindrical.

3. The device according to claim 1 wherein said cavity is a notch disposed on the circumference of and longitudinally along the axis of said release shaft.

4. The device according to claim 3 wherein said notch has a first surface and a second surface.

5. The device according to claim 4 wherein said stop is engageable with said first surface of said notch when said release lever is moved to activate said quick brake release mechanism.

6. The device according to claim 1 wherein said projection is axially aligned with said release shaft.

7. The device according to claim 1 wherein a threaded hole of a predetermined diameter and depth is axially located on said second end of said release shaft.

8. The device according to claim 1 wherein said projection is a threaded bolt.

9. The device according to claim 8 wherein said threaded bolt is engageable with a threaded hole of said release shaft.

10. The device according to claim 1 wherein said attachment is annular.

11. The device according to claim 1 wherein said tension member is a spring of a predetermined length and load rating.

12. In combination with a railcar hand brake, the improvement comprising a quick release mechanism having:

a. a release shaft rotatably mounted in such railcar hand brake, said release shaft having a first end and a second end, said first end including a cavity of a predetermined size and shape;

b. a release lever having a hub journaled on said first end of said release shaft;

c. a stop of a predetermined size and shape disposed on the circumference of said hub of said release lever and engageable with said cavity of said release shaft to rotate said release shaft and cause free release of the brake;

d. a projection of a predetermined size and shape disposed on said second end of said release shaft;

e. an attachment of a predetermined size and shape mounted to an inside wall of a housing of such hand brake; and f. a tension member having a first end and a second end, said first end of said tension member secured to said projection, and said second end of said tension member secured to said attachment to return said release shaft to the brake application position.

13. The combination according to claim 12 wherein the shape of said first end and said second end of said release shaft is substantially cylindrical.

14. The combination according to claim 12 wherein said cavity is a notch disposed longitudinally along the axis of said release shaft.

15. The combination according to claim 14 wherein said notch has a first surface and a second surface.

16. The combination according to claim 15 wherein said stop is engageable with said first surface of said notch when said release lever is moved to activate said quick brake release mechanism.

17. The combination according to claim 12 wherein said projection is axially aligned with said release shaft.

18. The combination according to claim 12 wherein a threaded hole of a predetermined diameter and depth is axially located on said release shaft.

19. The combination according to claim 12 wherein said projection is a threaded bolt.

20. The combination according to claim 19 wherein said threaded bolt is engageable with a threaded hole of said release shaft.

21. The combination according to claim 12 wherein said attachment is annular.

22. The combination according to claim 12 wherein said tension member is a spring of a predetermined length and load rating.

* * * * *